United States Patent [19]

VanderPol

[11] Patent Number: 4,823,655
[45] Date of Patent: Apr. 25, 1989

[54] MULTI-SPEED DRIVE SYSTEM FOR A PORTABLE LATHE

[75] Inventor: Jerald VanderPol, Eldorado Hills, Calif.

[73] Assignee: Tri Tool Inc., Rancho Cordova, Calif.

[21] Appl. No.: 904,404

[22] Filed: Sep. 8, 1986

[51] Int. Cl.⁴ .............................................. B23B 3/22
[52] U.S. Cl. ........................................ 82/113; 82/128; 74/670
[58] Field of Search ...................... 82/4 R, 4 C; 30/95, 30/96, 97, 98; 74/665 A, 665 B, 665 E, 670

[56] References Cited

U.S. PATENT DOCUMENTS

| | | | |
|---|---|---|---|
| 1,301,759 | 4/1919 | Stewart | 30/97 |
| 3,453,673 | 7/1969 | Arnot | 82/46 |
| 3,916,519 | 11/1975 | Gilmore | 30/97 |
| 4,390,147 | 6/1983 | Zuckerman | 74/670 |

Primary Examiner—Frederick R. Schmidt
Assistant Examiner—Robert Showalter
Attorney, Agent, or Firm—Bacon & Thomas

[57] ABSTRACT

A multi-speed drive system for a portable lathe is disclosed wherein two or more input drive gears are utilized to drive a cutting tool holder ring. Each of the input drive gears has a different pitch diameter so that it will impart different drive speeds/torque characteristics to the cutting tool holder ring. A main drive gear is interposed between each of the input drive gears and a ring gear attached to the cutting tool holder. The input drive gears are each engaged with the main drive gear and a drive motor is connected to the desired input drive gear.

3 Claims, 3 Drawing Sheets

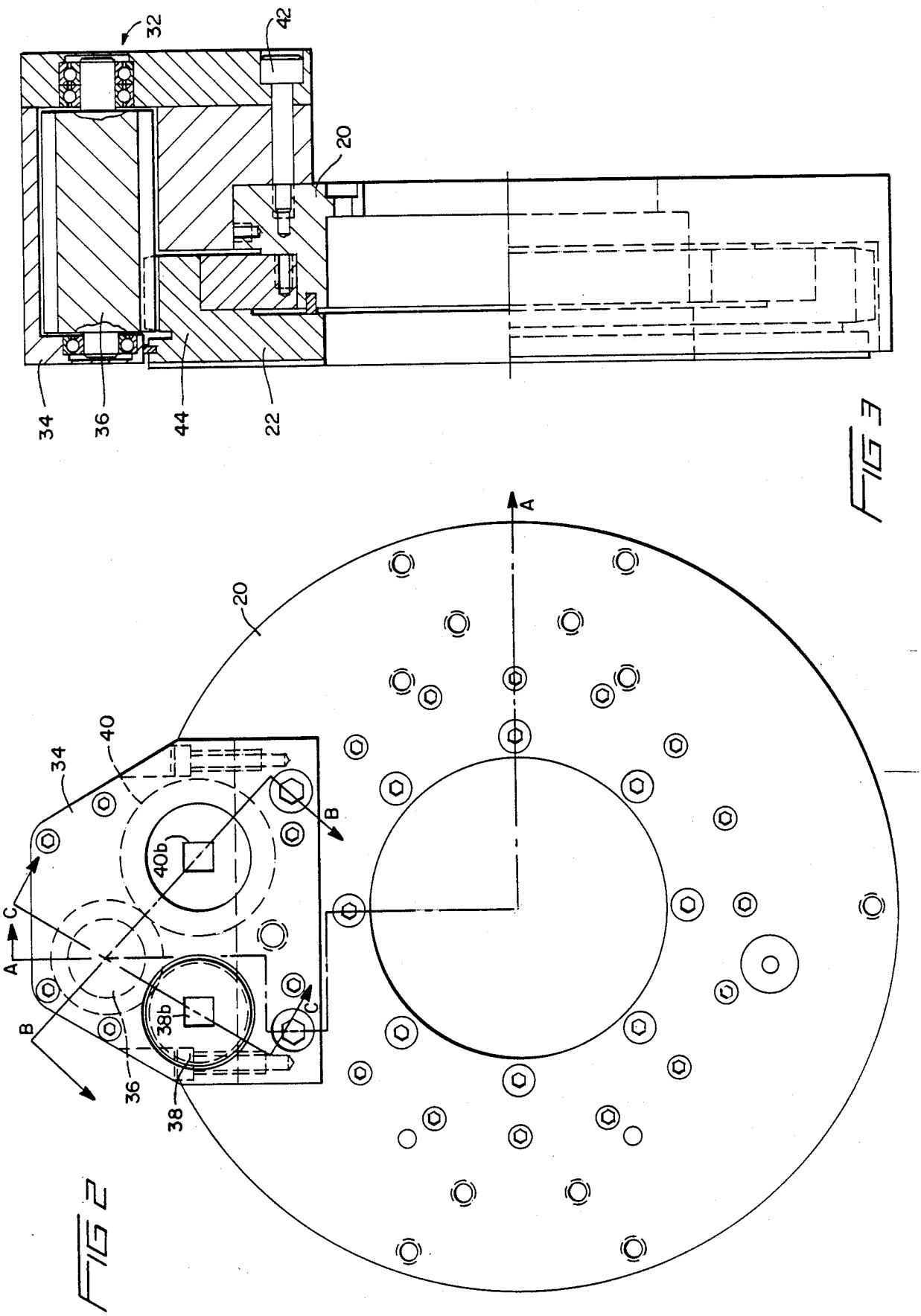

MULTI-SPEED DRIVE SYSTEM FOR A PORTABLE LATHE

BACKGROUND OF THE INVENTION

This invention relates to a multi-speed drive system for a portable lathe. Portable lathes typically have a stationary support ring attached to a mandrel which, in turn, is attached to the pipe or tube. A tool cutting holder ring is rotatably mounted on the stationary support ring and carries a tool holder in which is mounted a cutting tool. Several tool holders and tools may be affixed to a single cutting tool ring to perform multiple machining operations on the pipe end. Typically, such operations involve facing the end of the pipe and bevelling either the outer or inner periphery of the pipe adjacent the end.

A drive motor is mounted to the stationary support ring such that a pinion gear, attached to its rotating output shaft, engages a ring gear attached to the cutting tool holder ring. This serves to rotate the cutting tool ring with respect to the stationary support ring.

However, such portable lathes have been somewhat limited in their possible applications, since the drive mechanisms permitted only a single rotational speed of the cutting tool ring. The single speed drive systems inherently necessitated a compromise in the machining speed/torque parameters for machining different materials.

It is obviously desirable to be able to use a particular portable lathe on the widest variety of materials in order to minimize machining costs. However, when only a single speed drive is available, it is not possible to achieve a maximum machining speed and torque input for a wide variety of pipe materials. In machining harder pipe materials, such as stainless steel, the available torque input to the cutting tool ring may be below the optimum value and require a small cut for each revolution of the cutting tool ring. This, quite obviously, results in an inefficient operation, since it increases the time to achieve the desired results. If the portable lathe is used on a relatively soft material, such as cast iron, it is desirable to complete the machining in the shortest amount of time possible. This may require a higher rotational speed for the cutting tool ring than is available through the single speed drive mechanism.

SUMMARY OF THE INVENTION

The present invention obviates these drawbacks of the prior art portable lathes by providing a multi-speed drive system for driving the cutting tool ring. The multi-speed drive is achieved by a plurality of input drive pinion gears each engaging a main drive gear which, in turn, engages a ring gear attached to the cutting tool holder ring. Each of the input drive gears has a different pitch diameter so as to drive the ring gear at different speeds. A drive motor may be attached to any one of the input drive gears to provide the optimum cutting speed/torque characteristics for each machining application.

The plurality of input drive gears and the main drive gear may be rotatably mounted in a gear housing which is removably attached to the stationary support ring such that the main drive gear engages the ring gear. The gear housing, including the input drive gears and the main drive gear, may be removed as a unit and replaced with another gear housing having gear with different operating speed/torque characteristics.

BRIEF DESCRIPTION OF THE DRAWINGS

FIG. 2 is a rear view of a stationary support ring incorporating the multi-speed drive mechanism according to the invention.

FIG. 3 is a side view, partially in section, of the multi-speed drive mechanism according to the invention.

DETAILED DESCRIPTION OF THE PREFERRED EMBODIMENT

Figure 1:
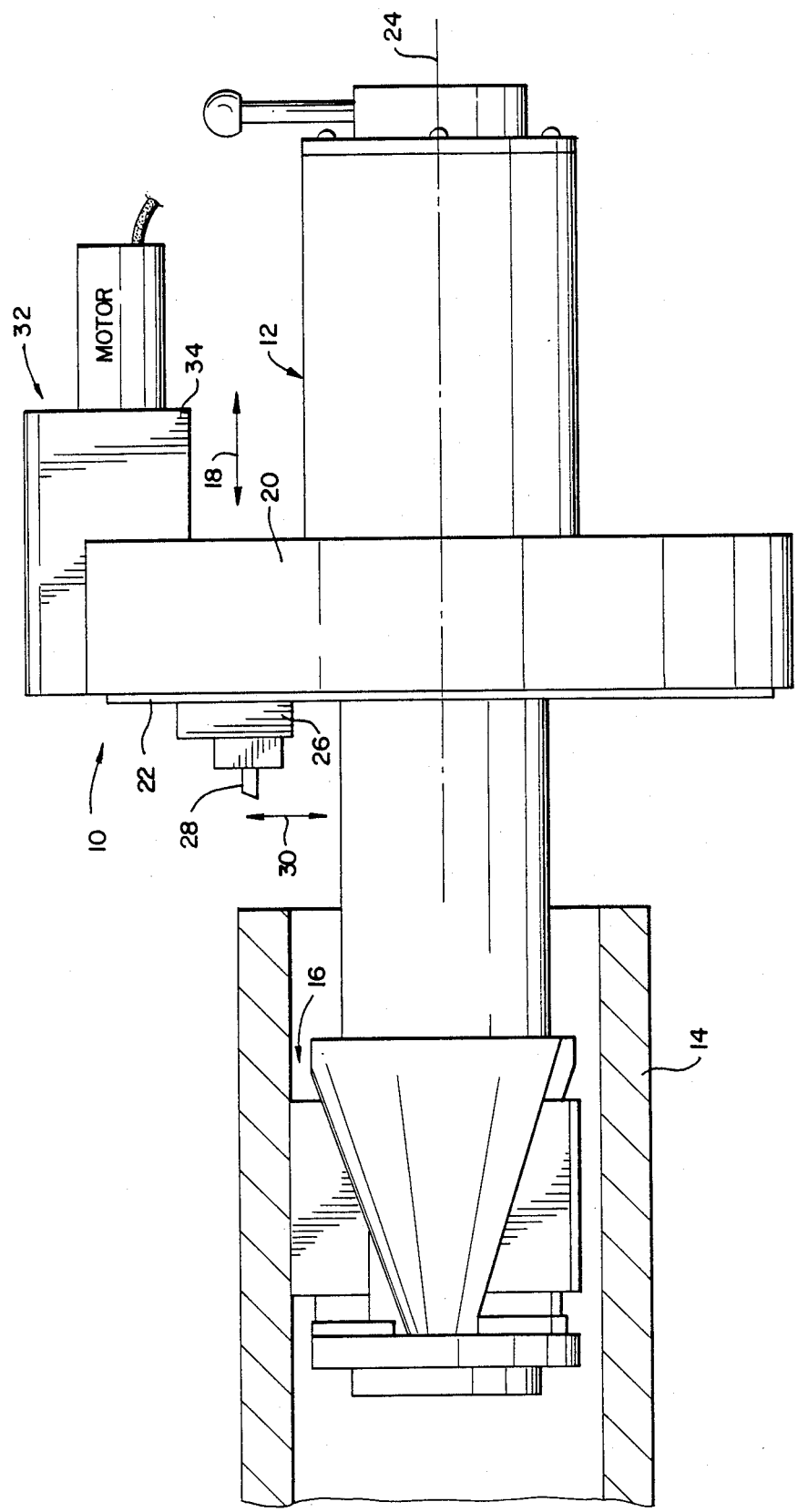
FIG. 1 is a side view of a portable lathe incorporating the multi-speed drive system according to the invention.
Figure 4:
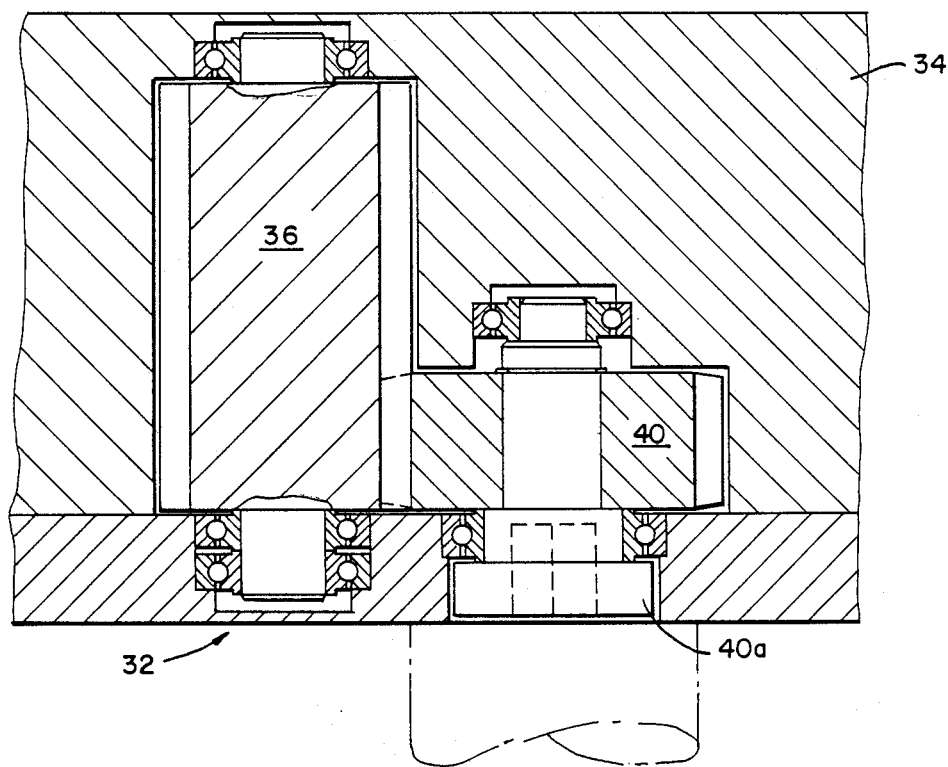
FIG. 4 is a sectional view taken along line B—B in FIG. 2.
Figure 5:
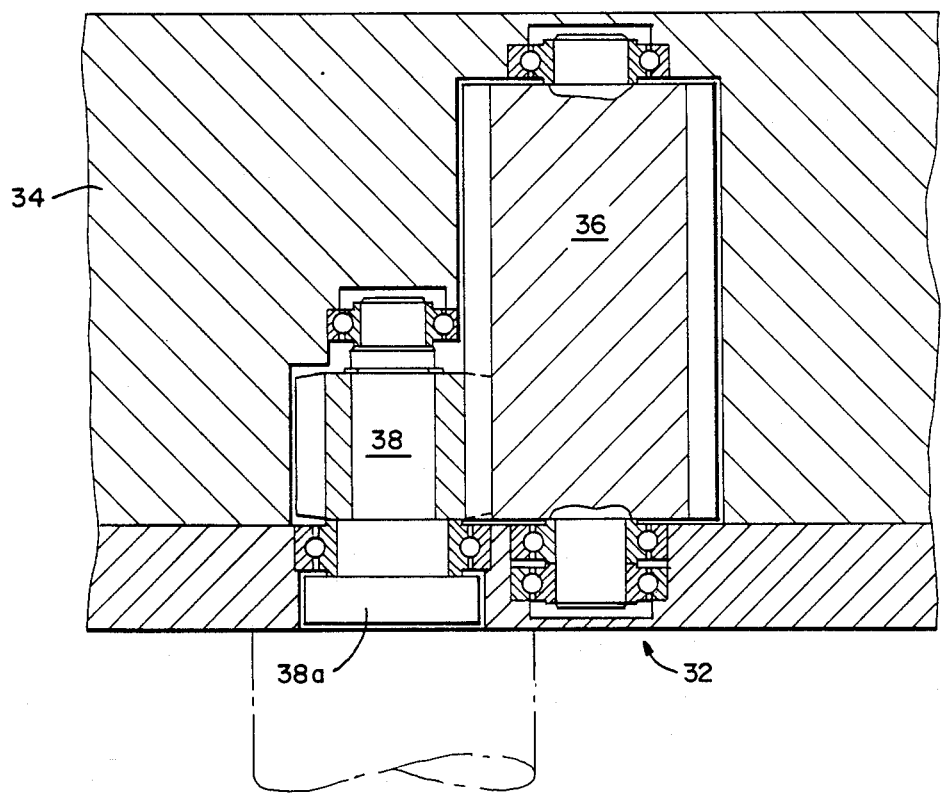
FIG. 5 is a sectional view taken along line C—C in FIG. 2.

As best seen in FIG. 1, the portable lathe according to the invention comprises a cutting head, generally indicated at 10, attached to a mandrel 12 which, in turn, is attached to pipe 14. Mandrel 12, in this particular illustration, has clamping means 16 thereon which may be clamped to the interior of pipe 14. However, it is to be understood that the mandrel and clamping system form no part of the present invention and any such known elements may be utilized in the scope of this invention.

Mandrel 12, as is well know in the art, may have a tool feed mechanism which moves the cutting head toward or away from the end of pipe 14, along the direction of arrows 18 such that a cutting tool may be brought into contact with the pipe end. It is believed that such feed mechanisms are well known in the art and need not be further described in detail. Suffice to say that any known feed mechanism can be utilized with the present invention.

The cutting head 10 comprises a stationary support ring 20 which is fixedly attached to Mandrel 12. A cutting tool holder ring 22 is rotatably attached to the stationary support ring 20 such that it rotates about its central axis 24. A cutting tool holder 26 and cutting tool 28 are attached to cutting tool holder ring 22 so as to rotate therewith. As cutting tool holder ring 22 rotates, tool feed means (not shown) are provided to feed tool holder 26 and tool 28 in a radial direction, indicated by arrows 30. Again, the specific tool feed means, per se, form no part of the instant invention and any such known feed system may be utilized without exceeding the scope of this invention. Thus, as can be seen, by moving the stationary support ring 20 to the left, as seen in FIG. 1 in the direction of arrow 18 and by feeding tool holder 26 and tool 28 in radial direction, as indicated by arrows 30, tool 28 may perform a machining operation on the end of pipe 14. Although only one cutting tool 28 is shown, it is within the scope of this invention to incorporate a plurality of such tools on cutting tool ring 22 such that several machining operations may be simultaneously carried out on the end of pipe 14.

The multi-speed drive mechanism 32 may comprise a gear housing 34 attached to stationary support ring 20 having a main drive gear 36, and input drive gears 38 and 40 rotatably mounted therein. When housing 34 is attached to stationary ring support 20, via bolts 42 or the like, a portion of main drive gear 36 operatively engages the teeth of ring gear 44 attached to cutting tool holder ring 22.

Although only two input drive gears 38 and 40 are shown, it is to be understood that more than two such gears may be utilized in the present invention. Input gears 38 and 40, which may be pinion gears, are rotatably mounted in housing 34 such that each of them are in constant engagement with main drive gear 36. Each input drive gear 38, 40 has a flange 38a, 40a attached thereto which is attachable to a drive motor. The flanges 38a and 40a may define an indentation having a polygonal cross-section, as shown at 38b and 40b, adapted to receive a similarly shaped drive shaft of a drive motor.

Input drive gears 38 and 40 each have different pitch diameters so as to provide differing drive characteristics to main drive gear 36. Input drive gear 38 has a smaller pitch diameter than input drive gear 40 and would, therefore, drive the cutting tool holder ring 22 at a lower speed, but would provide a greater input torque thereto. The drive motor would be attached to housing 34 so as to drive input gear 38 when it is desired to machine a pipe formed of a relatively hard material.

Input drive gear 40, having a larger pitch diameter than input drive gear 38, would drive the main drive gear 36 and, consequently, the cutting tool holder ring 22 at a higher speed than would input gear 38, but would provide less input torque to the cutting tool. Quite obviously, the drive motor would be attached so as to drive this input gear when machining softer materials.

The foregoing description is provided for illustrative purposes only and should not be construed as in any way limiting the invention, the scope of which is defined solely by the appended claims.

What is claimed is:

1. A multi-speed drive system for a portable lathe cutting head comprising:
   (a) a stationary support;
   (b) a cutting tool holder ring rotatably attached to the stationary support;
   (c) driven gear means attached to the cutting tool holder ring so as to rotate therewith;
   (d) a main drive pinion gear operatively engaging the driven gear means such that rotation of the main pinion drive gear causes rotation of the cutting tool holder ring, the main drive pinion gear having an axial length with a first axial portion adapted to be in operative engagement with input drive pinion gears and a second axial portion in operative engagement with the driven gear means;
   (e) a plurality of input drive pinion gears, each input drive pinion gear having a different pitch diameter and being operatively engageable with the first axial portion of the main drive pinion gear such that rotation of an input drive gear causes rotation of the main drive pinion gear, each input drive pinion gear having an axial length less than the axial length of the main drive pinion gear;
   (f) a gear housing;
   (g) mounting means rotatably mounting the main drive gear and the plurality of input drive pinion gears to the gear housing such that all input pinion gears simultaneously engage the main drive gear; and,
   (h) means to removably attach the gear housing to the stationary support such that the main drive gear operatively engages the driven gear means.

2. The multi-speed drive system according to claim 1 wherein the driven gear means comprises a ring gear.

3. The multi-speed drive system according to claim 1 further comprising input drive means associated with each input drive pinion gear adapted to connect each input drive pinion gear to a rotating power source.

* * * * *